United States Patent
Das et al.

(10) Patent No.: US 7,328,209 B2
(45) Date of Patent: Feb. 5, 2008

(54) SYSTEM FOR ONTOLOGY-BASED SEMANTIC MATCHING IN A RELATIONAL DATABASE SYSTEM

(75) Inventors: Souripriya Das, Nashua, NH (US); Eugene Inseok Chong, Concord, MA (US); George Eadon, Nashua, NH (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 467 days.

(21) Appl. No.: 10/916,547

(22) Filed: Aug. 11, 2004

(65) Prior Publication Data

US 2006/0036592 A1    Feb. 16, 2006

(51) Int. Cl.
    *G06F 17/30*    (2006.01)
(52) U.S. Cl. .................. 707/4; 707/3; 707/100
(58) Field of Classification Search ............... 707/3, 707/4
    See application file for complete search history.

(56) References Cited

U.S. PATENT DOCUMENTS 6,640,231 B1    10/2003    Andersen et al.
7,027,974 B1*    4/2006    Busch et al. ............... 704/4
2004/0030687 A1    2/2004    Hidaka et al.
2006/0036633 A1*    2/2006    Chong et al. ............... 707/101

OTHER PUBLICATIONS

Koehler, et al., "The semantic metadatabase (SEMEDA): Ontology based integration of federated molecular biological data sources.", Online! XP-00235974.
Koehler, et al., "SEMEDA: ontology based semantic integration of biological databases," Bioinformatics, vol. 19, No. 18, Dec. 12, 2003.
Koehler, et al., "Logical and Semantic Database Integration," Bioinformatics and Biomedical Engineering, 2000 proceedings, IEEE International Symposium on Nov. 8-10, 2000.
Bonatti, et al., "An Ontology-Extended Relational Algebra," IEEE International Symposium, Oct. 27, 2003.
W3C: "OWL Web Ontology Language Overview," Online XP002359705, Feb. 10, 2004.

* cited by examiner

*Primary Examiner*—Jeffrey Gaffin
*Assistant Examiner*—Christyann Pulliam
(74) *Attorney, Agent, or Firm*—Gordon E. Nelson

(57) ABSTRACT

The method for processing data in a relational database wherein ontology data that specifies terms and relationships between pairs of said terms expressed in an OWL document is stored in the database, database queries that include a semantic matching operator are formed which identify the ontology data and further specify a stated relationship between two input terms, and the query is executed to invoke the semantic matching operator to determine if the two input terms are related by the stated relationship by consulting said ontology data.

15 Claims, 2 Drawing Sheets

SYSTEM FOR ONTOLOGY-BASED SEMANTIC MATCHING IN A RELATIONAL DATABASE SYSTEM

FIELD OF THE INVENTION

This invention relates to methods and apparatus for storing and processing ontology data within a relational database management system (RDBMS).

BACKGROUND OF THE INVENTION

A single term often has different meanings in different contexts: the term "mouse" may refer to an animal in one context or to a computer input device in another. Different terms can mean the same thing, like the terms "TV" and "television." And terms may be related to one another in special ways; for example, a "poodle" is always a "dog" but a "dog" is not always a "poodle".

Humans learn to cope with the ambiguity of language by understanding the context in which terms are used. Computers can be programmed to do the same thing by consulting data structures called "ontologies" that represent terms and their interrelationships.

Data processing operations commonly need to match one term against another. Because a single term can have different meanings in different contexts, and different terms can mean the same thing, simply testing two values for equality often isn't sufficient. Consider, for example, a computerized restaurant guide application that recommends restaurants to a user based on her preferences. Such an application might employ a database table called "served_food" that identifies each restaurant by its ID number "R_id" in one column and by the kind of food it serves in a second column called "Cuisine." In the absence of semantic matching, if the user wished to identify restaurants serving Latin American cuisine, a conventional database application would most likely resort to a syntactic matching query using an equality operator as illustrated by the following SQL SELECT statement:

SELECT*FROM served_food WHERE cuisine='Latin American';

But this query would not identify restaurants listed as serving "Mexican," "Spanish," or "Portuguese" cuisine, since none of those terms identically match the term "Latin American" used in the query.

More meaningful results could be obtained by performing semantic matching which would take into account the meaning of terms. To do that, the matching process could consult an ontology like the one shown graphically in FIG. 1 which shows that the term "Latin American" encompasses the more specific cuisine types identified by the terms "Mexican," "Spanish" and "Portuguese."

The equality operation commonly used in a conventional database system only allows for matching based on the structure of the data type and doesn't take into account the semantics pertaining to a specific domain. Semantic meaning can be specified by one or more ontologies associated with the domain. In recent years, mechanisms for handling ontologies have received wide attention in the context of semantic web. See, for example, "The Semantic Web" by T. Berners-Lee, J. Hendler and O. Lassila in Scientific American, May, 2001. Tools for building and using ontologies have become available and include, for example: (1) OntologyBuilder and OntologyServer from VerticalNet described by A. Das, W. Wu, and D. McGuinness in "Industrial Strength Ontology Management," The Emerging Semantic Web, IOS Press, 2002, and (2) KAON described by B. Motik, A. Maedche, and R. Volz in "A Conceptual Modeling Approach for Semantics-Driven Enterprise Applications," Proceedings of the 2002 Confederated Int. Conferences DOA/CoopIS/ODBASE, 2002. These tools permit ontologies to be stored in a relational database, and provide a procedural API (application program interface) for accessing and manipulating the ontologies. To incorporate ontology-based semantic matching into an application, however a user needs to make use of the provided APIs to first query the ontology and then combine the results from the API with queries on database tables, a process that is burdensome to the user and requires additional processing.

The formal specification of an ontology facilitates building applications by separating the knowledge about the target domain from the rest of the application code. This separation substantially simplifies the application code, makes it easier to share the knowledge represented by the ontology among multiple applications, and allows that knowledge to be expanded or corrected without requiring changes to the application.

Relational database systems that are in widespread use must utilize ontologies to provide improved results. To achieve that, however, the existing capabilities of the RDBMS must be expanded to support ontology-based semantic matching in a relational database management system (RDBMS), and these enhanced capabilities should be made available in ways that are consistent with existing practices that are already familiar to database users.

SUMMARY OF THE INVENTION

The preferred embodiment of the present invention extends the capabilities of an existing relational database management system by introducing a set of new SQL operators, here named ONT_RELATED, ONT_EXPAND, ONT_DISTANCE, and ONT_PATH, to perform ontology-based semantic matching. These operators allow database users to reference ontology data directly using SQL statements can combine these semantic matching operators with other conventional SQL operations such as joins to make use of the full expressive power of SQL while performing semantic based matching. The semantic matching operators contemplated by the present invention make new, efficient ontology-based applications easy to develop, and make it possible to easily enhance existing RDBMS applications to obtain the benefit of semantic matching.

The ONT_RELATED operator performs ontology-based semantic matching and is expressed within an SQL statement using an expression of the form: "ONT_RELATED (term1, reltype, term2, ontology)."

When executed, the ONT_RELATED operator determines whether the two input terms (term1 and term2) are related by the specified input relationship type "reltype" by consulting the ontology.

Prior to executing a query containing the semantic matching operator, the specified ontology is registered with the database and mapped into system defined tables.

Two ancillary operators, ONT_DISTANCE and ONT_PATH, are employed to determine additional measures for the matched rows that are identified, namely, shortest distance and shortest path, respectively. These operators identify the terms that are most closely matched in the specified ontology. Two additional ancillary operators named ONT_DISTANCE_ALL and ONT_PATH_ALL return distance measures and path respectively for all matching terms identified in the ontology.

An operator named ONT_EXPAND expressed in the form ONT_EXPAND(term1, reltype, term2, ontology) is employed to directly access the ontology data. This operator computes the transitive closure for (term1, term2) based on the specified relationship (reltype) of the specified ontology.

The term1, reltype, and term2 can have either a specific input value or NULL value. The NULL means all possible values. For example, ONT_EXPAND(NULL, 'IS_A', 'Vehicle') will generate all terms that are related by 'IS_A' relationship to the term 'Vehicle'.

BRIEF DESCRIPTION OF THE DRAWINGS

In the detailed description which follows, frequent reference will be made to the attached drawings, in which.

DETAILED DESCRIPTION

1. Introduction

The present invention employs a set of SQL (Structured Query Language) operators to perform ontology-based semantic matching on data stored in a relational database management system (RDBMS). These SQL operators preferably take the form of extensions to the pre-existing SQL syntax employed by the database and may be implemented with the database extensibility capabilities (namely, the ability to define user-defined operators, user-defined indexing schemes, and table functions) typically available in a robust database system.

The specific embodiment of the invention described below has been implemented on top of the existing SQL syntax used in the Oracle family of databases. Detailed information on the Oracle SQL language and its syntax can be found in the Oracle 8i SQL Reference available from Oracle Corporation. This reference contains a complete description of the Structured Query Language (SQL) used to manage information in an Oracle database. Oracle SQL is a superset of the American National Standards Institute (ANSI) and the International Standards Organization (ISO) SQL92 standard. The preferred embodiment supports ontologies specified in Web Ontology Language (OWL [OWL Web Ontology Language Reference, (available on the World Wide Web at http://www.w3.org/TR/owl-ref), specifically, OWL Lite and OWL DL) by extracting information from the OWL document and then storing this information in the schema.

The ontology-based operators and the indexing scheme employed in the preferred embodiment uses Oracle's Extensibility Framework as described by J. Srinivasan, R. Murthy, S. Sundara, N. Agarval and S. DeFazio in "Extensible Indexing: A Framework for Integrating Domain-Specific Indexing into Oracle8i," Proceedings of the 16th International Conference on Data Engineering, pages 91-100, 2000. Specifically, the ONT_RELATED, ONT_DISTANCE, and ONT_PATH operators are implemented as user-defined operators and ONT_EXPAND is implemented as a table function. The operator implementation typically requires computing transitive closure, which is performed in Oracle SQL using queries with a CONNECT BY clause. Indexing is implemented as a user-defined indexing scheme. Although the ontology-based functions are described below in the context of an Oracle RDBMS, these functions can be supported in any RDBMS that supports the same basic capabilities provided by the Oracle RDBMS.

Figure 1:
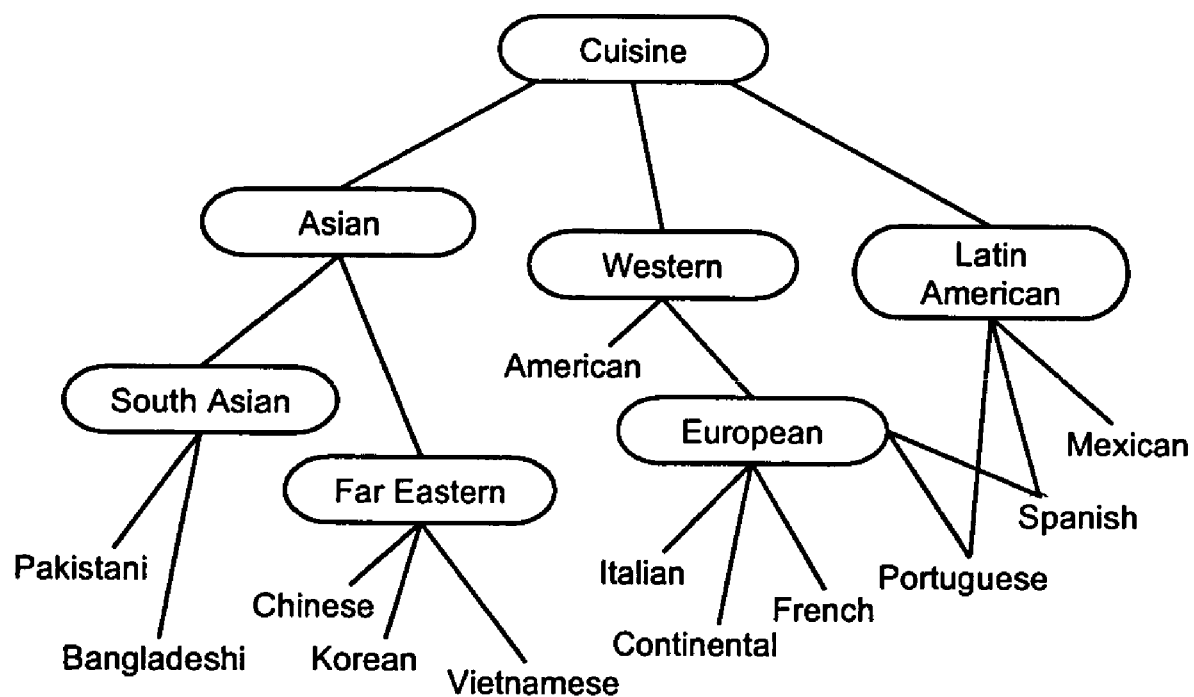
FIG. 1 is graph depicting a illustrative ontology that defines hierarchical relationships between terms used to describe food served by restaurants.

Before considering in detail how ontology-based matching and related functions are implemented, it will be useful to first consider how these operators might be used to provide the kind of semantic matching needed for the restaurant guide application noted in the background section above. To search the served_food database table for restaurants serving Latin American cuisine, the following SELECT statement might be used:

SELECT*FROM served_food WHERE ONT_RELATED (Cuisine, 'IS_A', 'Latin American', 'Cuisine_ontology')=1;

The ONT_RELATED operator in the statement above evaluates two input terms, a value from the Cuisine column in the table served_food and the string argument 'Latin American'. The ONT_RELATED operator consults the specified ontology 'Cuisine_ontology' for the meaning of the two terms (shown graphically in FIG. 1). If the operator determines that the two input terms are related by the input relationship type argument 'IS_A' by the ontology, it will return 1 (true), otherwise it returns 0 (false). The query thus identifies rows containing cuisines that are related to 'Latin American' based on the 'IS_A' relationship in the specified ontology and context, and would identify restaurants 2 and 14 (See the table restaurant in paragraph [0111]) which serve 'Mexican' and 'Portuguese' cuisine. The ONT_RELATED operator thus allows a user to introducing ontology-based semantic matching into SQL queries.

Optionally, as explained later in more detail, a user may want to get a measure for the rows identified by the ONT_RELATED operator. This can be achieved by using the ONT_DISTANCE ancillary operator. The ONT_DISTANCE operator gives a measure of how closely the terms are related by measuring the distance between the two terms. For example, the user may request that the results of the semantic matching query be sorted on this distance measure by submitting the following query:

SELECT*FROM served_food WHERE ONT_RELATED (cuisine, 'IS_A', 'Latin American', 'Cuisine_ontology', 123)=1 ORDER BY ONT_DISTANCE (123);

In this query, the integer argument 123 in ONT_DISTANCE identifies the filtering operator expression (ONT_RELATED) that computes this ancillary value. Similarly, another ancillary operator named ONT_PATH may be used to compute the path measure value between the two terms. Ancillary operators are described by R. Murthy, S. Sundara, N. Agarwal, Y. Hu, T. Chorma and J. Srinivasan in "Supporting Ancillary Values from User Defined Functions in Oracle", In Proceedings of the 19th International Conference on Data Engineering, pages 151-162, 2003.

In addition, a user may want to query an ontology independently (without involving user tables). The ONT_EXPAND operator described below can be used for this purpose.

Providing ontology-based semantic matching capability as part of SQL greatly facilitates developing ontology-driven database applications. Applications that can benefit include e-commerce (such as supply chain management, application integration, personalization, and auction). Also, applications that have to work with domain-specific knowledge repositories (such as BioInformatics, Geographical Information Systems, and Healthcare Applications) can take advantage of this capability. These capabilities can be exploited to support semantic web applications such as web service discovery as well. A key requirement in these applications is to provide semantic matching between syntactically different terms or sometimes between syntactically same, but semantically different terms.

Support for ontology-based semantic matching is achieved by introducing the following extensions to existing database capabilities:

A. Two new SQL operators, ONT_RELATED and ONT_EXPAND are defined to model ontology based semantic matching operations. For queries involving ONT_RELATED operator, two ancillary SQL operators, ONT_DISTANCE and ONT_PATH, are defined that return distance and path respectively for the filtered rows.

B. A new indexing scheme ONT_INDEXTYPE is defined to speed up ontology-based semantic matching operations.

C. A system-defined ONTOLOGIES table is provided for storing ontologies.

In the description which follows: Section 2 presents an overview of the features which support ontology-based semantic matching operations; Section 3 discusses the implementation of the ontology-related functions by extending the existing capabilities of an Oracle RDBMS; and Section 4 illustrates the manner in which ontology-related functions may be used in several illustrative database applications.

2. Supporting Ontology-based Semantic Matching in a Database System

2.1 Overview

Figure 2:
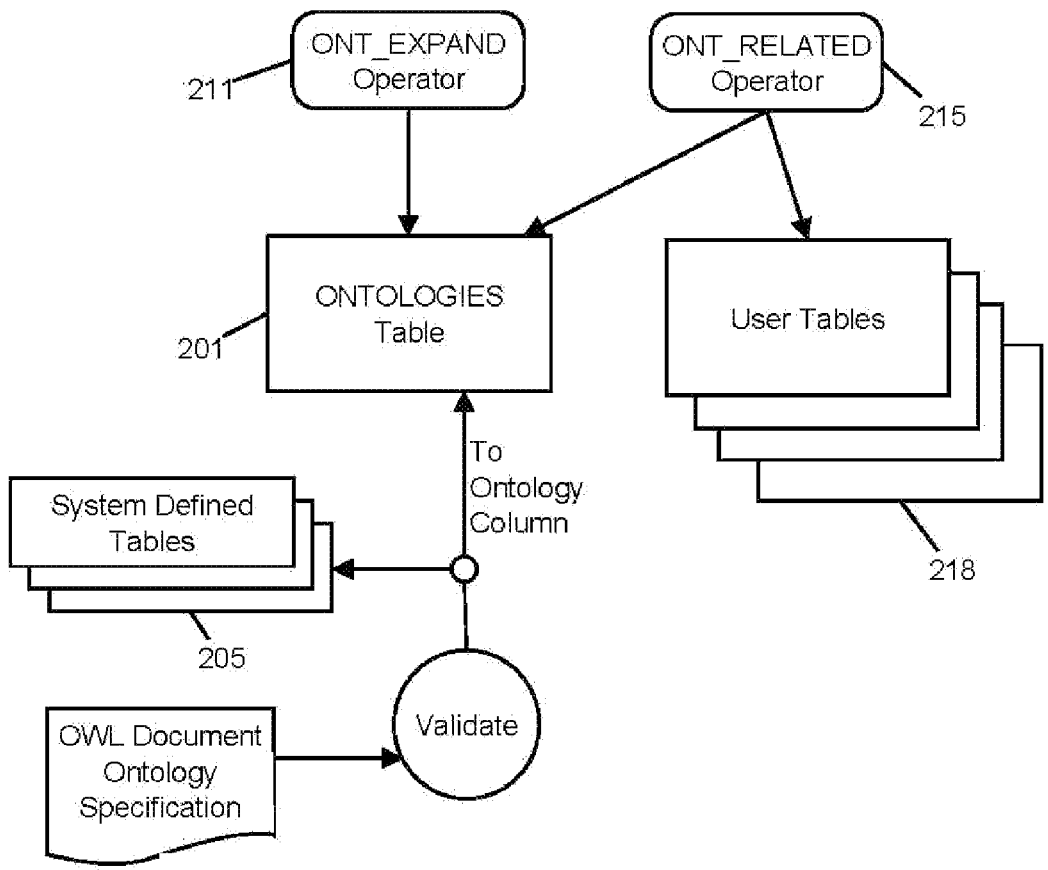
FIG. 2 is a block diagram illustrating the principle data structures used to implement the preferred embodiment of the invention.

The principle ontology-related data structures and functions used in the preferred embodiment are illustrated in FIG. 2 and may be summarized as follows:

A top-level ONTOLOGIES table seen at 201 holds ontology data, which internally maps to a set of system-defined tables shown at 205.

Two operators are used for querying purposes. The ONT_EXPAND operator 211 can be used to query the ontology independently, whereas the ONT_RELATED operator 215 can be used to perform queries on one or more user tables 218 holding ontology terms whose meaning is specified by ontology data in the system defined tables 205. Optionally, a user can use ancillary operators ONT_DISTANCE and ONT_PATH operators in queries involving the ONT_RELATED operator 215 to get additional measures (distance and path) for the filtered rows extracted by the queries.

2.2 RDBMS Schema for Storing Ontologies

An RDBMS schema has been created for storing ontologies specified in OWL. This RDBMS schema defines the following tables:

Ontologies: Contains basic information about various ontologies, and includes the columns OntologyID, OntologyName, and Owner.

Terms: Represents classes, individuals, and properties in the ontologies, and includes the column TermID, OntologyID, Term, and Type. A term is a lexical representation of a concept within an ontology. TermID value is generated to be unique across all ontologies. This allows representation of references to a term in a different ontology than the one that defines the term. Also, even an OntologyID is handled as a TermID which facilitates storing values for various properties (e.g., Annotation Properties) and other information that applies to an ontology itself. Note that, as a convention, any column in the above schema whose name is of the form ". . . ID. .", would actually contain TermID values (like a foreign key).

Properties: Contains information about the properties, and includes the columns OntologyID, PropertyID, DomainClassID, RangeClassID, and Characteristics. Domain and range of a property are represented with TermID values of the corresponding classes. Characteristics indicate which of the following properties are true for the property: symmetry, transitivity, functional, inverse functional.

Restrictions: Contains information about property restrictions, and includes the columns OntologyID, NewClassID, PropertyID, MinCardinality, MaxCardinality, SomeValuesFrom, and AllValuesFrom. Restrictions on a property results in definition of a new class. This new class is not necessarily named (i.e., 'anonymous' class) in OWL. However, internally we create a new (system-defined) class for ease of representation.

Relationships: Contains information about the relationship between two terms, and includes the OntologyID, TermID1, PropertyID, and TermID2.

PropertyValues: Contains <Property, Value> pairs associated with the terms and includes the columns OntologyID, TermID, PropertyID, and Value. In order to handle values of different data types, some combinations of the following may be used: Define separate tables (or separate columns in the same table) for each of the frequently encountered types and use a generic self-describing type (ANYDATA in Oracle RDBMS) to handle any remaining types.

System-defined Classes for Anonymous Classes: We create internal (i.e., not visible to the user) or system-defined classes to handle OWL anonymous classes that arise in various situations such as Property Restrictions, enumerated types (used in DataRange), class definitions expressed as expression involving IntersectionOf, UnionOf, and ComplementOf.

Bootstrap Ontology: The first things that are loaded into the above schema are the basic concepts of OWL itself. In some sense this is like the bootstrap ontology. For example:

Thing and Nothing are stored as Classes.

subClassOf is stored as a transitive (meta) property that relates two classes.

subPropertyOf is stored as a transitive (meta) property that relates two properties.

disjointWith is stored as a symmetric (meta) property that relates two classes.

SameAs is stored as a transitive and symmetric property that relates two individuals in Thing class.

Storing these OWL concepts as a bootstrap ontology facilitates inferencing. A simple example would be the following: If C1 is a subclassOf C2 and C2 is a subclassOf C3, then (by transitivity of subClassOf) C1 is a subclassOf C3. Note that the reflexive nature of subClassOf and SubPropertyOf is handled as a special case.

Loading Ontologies: An ontology is loaded into the database by using an API that takes as input an OWL document. Information from the OWL document is extracted and then stored into the system-defined tables in the RDBMS schema described above.

The Ontologies table stores some basic information about all the ontologies that are currently stored in the database. A portion (view) of this table is visible to the user.

2.3 Modeling Ontology-based Semantic Matching

To support ontology-based semantic matching in RDBMS several new operators are defined.

2.3.1 ONT_RELATED Operator. This operator models the basic semantic matching operation. It determines if the two input terms are related with respect to the specified RelType relationship argument within an ontology. If they are related it returns 1, otherwise it returns 0.

ONT_RELATED (Term1, RelType, Term2, OntologyName) RETURNS INTEGER;

The RelType can specify a single ObjectProperty (for example, 'IS_A', 'EQV', etc.) or it can specify a combination of such properties by using AND, NOT, and OR operators (for example, 'IS_A OR EQV'). Note that both Term1 and Term2 need to be simple terms. If Term2 needs to be complex involving AND, OR, and NOT operators, user can issue query with individual terms and combine them with INTERSECT, UNION, and MINUS operators. See Section 2.3.4 for an example.

RelType specified as an expression involving OR and NOT operators (e.g., FatherOf OR MotherOf) is treated as a virtual relationship (in this case say AncestorOf) that is transitive by nature (also see Section 3.2.5).

2.3.2 ONT_EXPAND Operator. This operator is introduced to query an ontology independently. Similar to ONT_RELATED operator, the RelType can specify either a simple relationship or combination of them.

CREATE TYPE ONT_TermRelType AS OBJECT (
Term1Name VARCHAR(32),
PropertyName VARCHAR(32),
Term2Name VARCHAR(32),
TermDistance NUMBER,
TermPath VARCHAR(2000)
);
CREATE TYPE ONT_TermRelTableType AS TABLE OF ONT_TermRelType;
ONT_EXPAND (Term1, RelType, Term2, OntologyName
) RETURNS ONT_TermRelTableType;

Typically, non-NULL values for RelType and Term2 are specified as input and then the operator computes all the appropriate <Term1, RelType, Term2> tuples in the closure taking into account the characteristics (transitivity and symmetry) of the specified RelType. In addition, it also computes the relationship measures in terms of distance (TermDistance) and path (TermPath). For cases when a term is related to input term by multiple paths, one row per path is returned. It is also possible that ONT_EXPAND invocation may specify input values for any one or more of the three parameters or even none of the three parameters. In each of these cases, the appropriate set of <Term1, RelType, Term2> tuples is returned.

2.3.3 ONT_DISTANCE and ONT_PATH Ancillary Operators. These operators compute the distance and path measures respectively for the rows filtered using ONT_RELATED operator.

ONT_DISTANCE (NUMBER) RETURNS NUMBER;
ONT_PATH (NUMBER) RETURNS VARCHAR;

A single resulting row can be related in more than one way with the input term. For such cases, the above operators return the optimal measure, namely smallest distance or shortest path. For computing all the matches, the following two operators are provided:

ONT_DISTANCE_ALL (NUMBER)
RETURNS TABLE OF NUMBER;
ONT_PATH_ALL (NUMBER)
RETURNS TABLE OF VARCHAR;

2.3.4 A Restaurant Guide Example. Consider a restaurant guide application that maintains type of cuisine served at various restaurants. It has two tables, 1) restaurants containing restaurant information, and 2) servedfood containing the types of cuisine served at restaurants.

The restaurant guide application takes as input a type of cuisine and returns the list of restaurants serving that cuisine. Obviously, applications would like to take advantage of an available cuisine ontology to provide better match for the user queries. The cuisine ontology describes the relationships between various types of cuisines as shown earlier in FIG. 1.

Thus, if a user is interested in restaurants that serve cuisine of type 'Latin American', the database application can generate the following query:

SELECT r.name, r.address
FROM served_food sf, restaurant r
WHERE r.id=sf.r_id AND ONT_RELATED(sf.cuisine,
'IS_A OR EQV',
'Latin American',
'Cuisine_ontology')=1;

To query on 'Latin American' AND 'Western' the application program can obtain rows for each and use the SQL INTERSECT operation to compute the result.

Also, the application can exploit the full SQL expressive power when using ONT_RELATED operator. For example, it can easily combine the above query results with those restaurants that have lower price range.

SELECT r.name FROM served_food sf, restaurant r
WHERE r.id=sf.r_id AND ONT_RELATED(sf.cuisine,
'IS_A OR EQV',
'Latin American',
'Cuisine_ontology')=1 AND r.price_range='$';

2.3.5 Discussion. Note that the queries in section 2.3.4 can also be issued using the ONT_EXPAND operator. For example, the first query in that section can alternatively be expressed using ONT_EXPAND as follows:

SELECT r.name, r.address FROM served_food sf, restaurant r
WHERE r.id=sf.r_id AND sf.cuisine IN
(SELECT Term1Name from TABLE(ONT_EXPAND (NULL, 'IS_A OR EQV',
'Latin American', 'Cuisine_ontology')));

The ONT_RELATED operator is provided in addition to ONT_EXPAND operator for the following reasons:

The ONT_RELATED operator provides a more natural way of expressing semantic matching operations on column holding ontology terms; and It allows use of an index created on column holding ontology terms to speed up the query execution by taking column data into account.

2.4 Inferencing

Inferencing rules employing the symmetry and transitivity characteristics of properties are used to infer new relationships. This kind of inferencing can be achieved through the use of the operators defined above (see Section 3.2 for details). Note that our support for inferencing is restricted to OWL Lite and OWL DL, both of which are decidable.

To support more complete inferencing using the above operators, an initial phase of inferencing is done after ontology is loaded, and the results of this inferencing are stored persistently and used in subsequent inferencing. Several examples of the initial inferencing follow.

All subPropertyOf relationships are derived and stored during this phase. The transitive aspects of sameAs (e.g., sameAs(x,y) AND sameAs(y,z) IMPLIES sameAs(x,z)) can be handled by the operators defined above. However, the more complex rules which imply sameAs (e.g., p is a functional property AND p(a,x) AND p(b,y) AND sameAs (a,b) IMPLIES sameAs(x,y)) are best handled outside of the operator implementation. We expect these complex sameAs inferences to be done during the initial inferencing phase. To provide the semantics of sameAs during closure computation, the operators will treat an individual 'I' as 'I OR J' for all J where sameAs(I, J).

Furthermore, we are introducing an internal relationship that will be useful for inferencing over complex subPropertyOf and inverseOf interactions:

SubPropertyOfInverseOf(f,g) iff f(x,y) IMPLIES g(y,x).

Again, we expect that the rules that introduce SubPropertyOfInverseOf (spiOf, for short) into an ontology (e.g., inverseOf(f,g) IMPLIES spiOf(f,g) AND spiOf(g,f)) will be handled during the initial inferencing phase. However, the transitive aspects of spiOf can be handled as a special case within our operators, according to the following rules:

subPropertyOf(f,g) AND spiOf(g,h) IMPLIES spiOf(f,h)
  (Proof: f(x,y) IMPLIES g(x,y) IMPLIES h(y,x))
spiOf(f,g) AND subPropertyOf(g,h) IMPLIES spiOf(f,h)
  (Proof: f(x,y) IMPLIES g(y,x) IMPLIES h(y,x))
spiOf(f,g) AND spiOf(g,h) IMPLIES SubPropertyOf(f,h)
  (Proof: f(x,y) IMPLIES g(y,x) IMPLIES h(x,y))

Given the expansion of subPropertyOf and spiOf, we can find all relationship tuples for a given property, including those that are implied through sub-properties and inverse-properties. Consider the following example where non-transitive properties are used for clarity, which expands ParentOf. In this case, if we have subPropertyOf(MotherOf, ParentOf) and inverseOf(MotherOf, hasMother), we will get spiOf(hasMother, ParentOf) based on result of the initial inferencing phase and the above rules. Then hasMother (child, mother) will be sufficient to yield ParentOf(mother, child) in the result set:

SELECT r.termID1, 'ParentOf', r.termID2 FROM relationships r, terms t
WHERE r.propertyID=t.termID AND t.term IN
(select term1Name FROM
TABLE(ONT_EXPAND(NULL,
'subPropertyOf',
'ParentOf',
'Family_ontology')))
UNION
SELECT r.termID2, 'ParentOf', r.termID1
FROM relationships r, terms t
WHERE r.propertyID=t.termID
AND t.term IN
(select term1Name FROM
TABLE(ONT_EXPAND(NULL,
'spiOf',
'ParentOf',
'Family_ontology')))

3. Implementation of Ontology Related Functionality on Oracle RDBMS

This section describes how the ontology-related functionality is implemented on top of Oracle RDBMS.

3.1 Operators

The ONT_RELATED operator is defined as a primary user-defined operator, with ONT_DISTANCE and ONT_PATH as its ancillary operators. The primary operator computes the ancillary value as part of its processing [99]. In this case, ONT_RELATED operator computes the relationship. If ancillary values (the distance and path measure) are required, it computes them as well.

Note that the user-defined operator mechanism in Oracle allows for sharing state across multiple invocations. Thus, the implementation of the ONT_RELATED operator involves building and compiling an SQL query with CONNECT BY clause (as described in Section 3.2) during its first invocation. Each subsequent invocations of the operator simply uses the previously compiled SQL cursor, binds it with the new input value, and executes it to obtain the result.

The ONT_EXPAND operator is defined as a table function as it returns a table of rows, which by default includes the path and distance measures.

3.2 Basic Algorithm

Basic processing for both ONT_RELATED and ONT_EXPAND involves computing transitive closure, namely, traversal of a tree structure by following relationship links given a starting node. Also, as part of transitive closure computation, we need to track the distance and path information for each pair formed by starting node and target node reached via the relationship links.

Oracle supports transitive closure queries with CONNECT BY clause as follows:

SELECT . . . FROM . . . START WITH <condition>
CONNECT BY <condition>;

The starting node is selected based on the condition given in START WITH clause, and then nodes are traversed based on the condition given in CONNECT BY clause. The parent node is referred to by the PRIOR operator. For computation of distance and path, the Oracle-provided LEVEL psuedo-column and SYS_CONNECT_BY_PATH function are respectively used in the select list of a query with CONNECT BY clause.

Note that in the system-defined Relationships table, a row represents 'TermID1 is related to TermID2 via PropertyID relationship.' For example, if 'A IS_A B', it is represented as the row <1, A, IS_A, B> assuming that the ontologyID is 1.

Note that any cycles encountered during the closure computation will be handled by the CONNECT BY NOCYCLE query implementation available in Oracle 10g (not explicitly shown in the examples below).

For simplicity, we use a slightly different definition for the relationships table where term names are stored instead of termIDs. In this case, the Relationships table has the columns (OntologyName, Term1, Relation, Term2, . . . ).

To illustrate the processing, we use the restaurant guide example. The data in the restaurant and served_food tables is shown below:

| restaurant | | | |
|---|---|---|---|
| Id | Name | price_range | . . . |
| 1 | Mac | $ | |
| 2 | Chilis | $$ | |
| 3 | Anthonys | $$$ | |
| 4 | BK | $ | |
| 5 | Uno | $$ | |
| 6 | Wendys | $ | |
| 7 | Dabin | $$ | |
| 8 | Cheers | $$ | |

-continued

| | | |
|---|---|---|
| 9 | KFC | $ |
| 10 | Sizzlers | $$ |
| 11 | Rio | $$ |
| 12 | Maharaj | $$ |
| 13 | Dragon | $$ |
| 14 | Niva | $$ | served_food

| R_id | cuisine |
|---|---|
| 1 | American |
| 2 | Mexican |
| 2 | American |
| 3 | American |
| 4 | American |
| 5 | American |
| 5 | Italian |
| 6 | American |
| 7 | Korean |
| 7 | Japanese |
| 8 | American |
| 9 | American |
| 10 | American |
| 11 | Brazilian |
| 12 | Mexican |
| 12 | Indian |
| 13 | Chinese |
| 14 | Portuguese |

3.2.1 Handling Simple Terms. Consider a query that has simple relation types, i.e., no AND, OR, NOT operators. The first query given in Section 2.3.4 can be converted as follows:

Original Query:
SELECT r.name, r.address FROM served_food sf, restaurant r
WHERE r.id=sf.r_id AND
ONT_RELATED(sf.cuisine, 'IS_A', 'Latin American', Cuisine_ontology')=1;
Transformed Query:
SELECT r.name, r.address
FROM served_food sf restaurant r
WHERE r.id=sf.r_id AND
sf.cuisine IN (SELECT term1 FROM relationships
START WITH
term2='Latin American' AND relation='IS_A'
CONNECT BY
PRIOR term1=term2 AND relation='IS_A');

The text in boldface above is the portion that has been converted. Basically, the third argument is translated into START WITH clause and the second argument into CONNECT BY clause. The result for this query is as follows:

Query Result

| NAME | ADDRESS |
|---|---|
| Chilis | |
| ... | |
| Maharaj | |
| ... | |
| Niva | ... |

Figure 3:
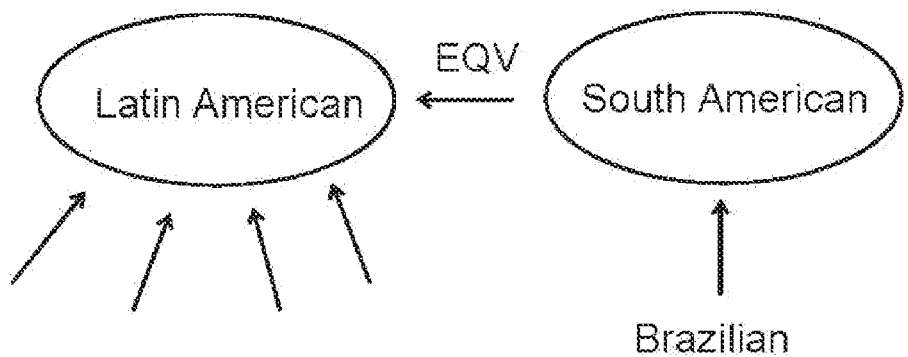
FIG. 3 is a diagram illustrating the addition of an EQV relationship.

3.2.2 Handling OR Operator. Consider a case where 'Brazilian' cuisine was not originally included in the ontology and is now inserted under the 'South American' cuisine. Also, to put 'South American' cuisine in the same category as 'Latin American' cuisine, the transitive and symmetric 'EQV' relationship is used as shown in FIG. 3:

Now, to get 'Latin American' cuisine, disjunctive conditions should be used to traverse both relationship links, that is, 'IS_A' and 'EQV'. Such disjunctive conditions can be directly specified in the START WITH and CONNECT BY clauses.

Original Query:
SELECT r.name, r.address FROM served_food sf, restaurant r
WHERE r.id=sf.r_id AND
ONT_RELATED(sf.cuisine,
'IS_A OR EQV',
'Latin American',
'Cuisine_ontology')=1;
Transformed Query:
The only differences from the transformed query of the previous example is that the relationships table:
FROM relationships
is replaced by a sub-query to introduce the implicit symmetric edges into the query:
FROM (SELECT term1, relation, term2
FROM relationships
UNION
SELECT term2, relation, term1
FROM relationships
WHERE relation='EQV')
and the occurrence of the following predicate in START WITH and CONNECT BY clauses
relation='IS_A'
is replaced with the following predicate:
(relation='IS_A' OR relation='EQV')

3.2.3 Handling AND operator. Conjunctive conditions between transitive relationship types can be handled by independently computing the transitive closure for each relationship type and then applying set INTERSECT on the resulting sets. For each node in the intersection, a path exists from the start node to this node for each relationship type and hence this is sufficient.

Let us consider another relationship between cuisines, which identifies the spiciest cuisine using the term MOST_SPICY. The ontology can now contain information such as 'South Asian cuisine is MOST_SPICY Asian cuisine' and 'Indian cuisine is MOST_SPICY South Asian cuisine,' etc.

To find very spicy cuisine from the ontology, user can issue a query using conjunctive conditions in the relationships as follows:

Original Query: Find a restaurant that serves very spicy Asian cuisine.

SELECT r.name FROM served_food sf, restaurant r
WHERE r.id = sf.r_id AND
ONT_RELATED(sf.cuisine,
    'IS_A AND MOST_SPICY'
    'Asian',
    'Cuisine_ontology') = 1;
Transformed query:
    SELECT r.name FROM served_food sf, restaurant r
    WHERE r.id = sf.r_id AND
    sf.cuisine IN
    (
    SELECT term1 FROM relationships
    START WITH
    term2 = 'Asian' AND
        relation = 'IS_A'
        CONNECT BY

```
-continued

PRIOR term1 = term2 AND
    relation = 'IS_A'
INTERSECT
    SELECT term1 FROM relationships
START WITH
    term2 = 'Asian' AND
    relation = 'MOST_SPICY'
CONNECT BY
    PRIOR term1 = term2 AND
    relation = 'MOST SPICY');
```

3.2.4 Handling NOT operator. A NOT operator specifies which relationships to exclude when finding transitive closure. Therefore, given the start node all relationships except ones specified in NOT operator will be traversed. NOT operators can be directly specified in the START WITH and CONNECT BY clauses.

Original Query: Find all Latin American cuisine, excluding 'EQV' relationship types.

SELECT r.name FROM served_food sf, restaurant r
WHERE r.id=sf.r_id AND
ONT_RELATED(sf.cuisine,
'NOT EQV',
'Latin American',
'Cuisine_ontology')=1;

Transformed Query: Only difference from the transformed query of the example in Section 3.2.1 is that the occurrence of the following predicate in START WITH and CONNECT BY clauses relation='IS_A' is replaced with the following predicate:

relation !='EQV'

Note that if a user wants to retrieve all cuisines except Latin American cuisine, then the query can be formulated using the operator ONT_RELATED returning 0 as follows:

```
  . . .
ONT_RELATED(sf.cuisine,
    'IS_A'
    'Latin American',
    'Cuisine_ontology')=0;
```

3.2.5 Handling Combination of OR, AND, and NOT. OR and NOT operators are directly specified in the CONNECT BY clause and AND operators are handled by INTERSECT. All conditions are rewritten as conjunctive conditions. For example, 'A OR (B AND C)' will be converted into '(A OR B) AND (A OR C).' Then, '(A OR B)' and '(A OR C)' are specified in the CONNECT BY clause in separate queries that can be combined with INTERSECT operator.

4. Ontology-driven Database Applications

This section illustrates the usage of the ontology-related semantic matching operations by considering several database applications.

4.1 A Homeland Security Application

An intelligence analyst for homeland security would be very much interested in an activity that might be related to terrorism. From the example pattern given in [20], where a person rents a truck and another person buys fertilizer, and they reside in the same house, we can formulate an SQL query using ONT_RELATED operator for a given activity table:

TABLE 5

| Person_name | Address | Activity | Object |
|---|---|---|---|
| John Buck | Addr1 | Rent | Ford F-150 |
| Jane Doe | Addr1 | Buy | Ammonium Nitrate |
| . | . | . | . |
| . | . | . | . |
| . | . | . | . |

```
SELECT *
    FROM ACTIVITY x, ACTIVITY y
        WHERE
            x.Activity = 'Rent' AND
            y.Activity = 'Buy' AND
            ONT_RELATED(x.object, 'IS_A','Truck',
                'vehicle_ontology') = 1 AND
            ONT_RELATED(y.object,'IS_A','Fertilizer',
                'chemical_ontology')=1 AND
            x.Address = y.Address;
```

By referring to more than one ontology we can analyze suspicious activities involving a combination of different actions.

4.2 A Supply Chain Application

A supply chain where thousands of products and services are exchanged has a major issue of standardizations of purchase order, bill of material, catalogs, etc. There could be name, language, currency, and unit differences to resolve to name a few. Standardization efforts such as RosettaNet [22], UNSPSC [23] for product category and ebXML [24] to standardize business processes and products are not enough to meet individual vendor/customer needs to resolve semantic differences. Typically, these conflicts have been resolved using some form of mapping mechanisms [6].

These conflicts can be resolved by issuing an SQL query with ONT_RELATED operator using ontologies. Even individually developed ontologies may need the ontology mappings to communicate each other. We can apply ONT_RELATED and ONT_EXPAND operators to the mapping ontology to resolve the conflicts as well.

4.3 A Life Science Application

Life Science domain applications have been using ontologies for representing knowledge as well as the basis of information integration of several heterogeneous sources of life science web databases. Let us consider Gene Ontology (GO)[12], which is primarily used to represent the current knowledge in this domain. It allows user to query using SQL. One sample query is 'Fetching every term that is a transmembrane receptor'. The GO Graph is stored using the 'term' (=node) and 'term2term' (=arc) tables. It also maintains a table called 'graph_path', which stores all paths between a term and all its ancestors. In GO database the following SQL query can be issued for this purpose:

```
SELECT
    rchild.*
FROM
    term AS rchild, term AS ancestor,
    graph_path
WHERE
    graph_path.term2_id = rchild.id and
    graph_path.term1_id = ancestor.id and
    ancestor.name = 'transmembrane receptor';
```

The following query can be used if the data is stored in Oracle RDBMS:

SELECT*FROM TABLE
(ONT_EXPAND (NULL, 'IS_A',
'transmembrane receptor', 'gene_ontology'));

The key difference is that the GO database exposes the underlying schema and requires users to formulate queries against those tables, whereas the operator approach attempts to simplify the specification.

4.4 A Web Service Application

Similarly, web service applications can also utilize the ONT_RELATED operator to match two different terms semantically. Consider the web-service matching example described in [8], where user is looking to purchase a sedan. The user requests a web service using the term 'Sedan'. The vehicle ontology contains 'Sedan', 'SUV', and 'Station Wagon' as subclasses of the term 'Car'. The web service can alert the user by using the query with the ONT_RELATED operator as follows:

```
...
ONT_RELATED(user_request,
    'IS_A',
    'Car',
        'Vehicle_Ontology')
= 1;
```

The degree of match between terms, i.e. how closely the terms are related, as described in [8], can be handled using ONT_DISTANCE and ONT_PATH operators.

5. Conclusions

With the increasing importance of ontologies in business database application areas, it is important that ontologies are stored in databases for efficient maintenance, sharing, and scalability. Equally important is the capability for ontology-based semantic matching in SQL for performance and ease of application development.

The specific embodiment of the invention which has been described addresses these issues by allowing OWL Lite and OWL DL based ontologies to be stored in Oracle RDBMS and by providing a set of SQL operators for ontology-based semantic matching.

It is to be understood that the specific examples described above are merely illustrative applications of the principles of the invention. Numerous modifications may be made to the methods, data structures and SQL statements that have been presented without departing from the true spirit and scope of the invention.

What is claimed is:

1. A method of processing data stored in a relational database management system comprising, in combination, the steps of:
    storing ontology data to which the relational database management system has access that specifies terms and relationships between pairs of said terms,
    forming a database query in a query language that is native to the relational database management system, the database query including a semantic matching operator defined in the native query language that identifies said ontology data and a further specifies a stated relationship between two input terms, and
    executing said query in the relational database management system to invoke said semantic matching operator to consult said ontology data and return a result to said executing query which indicates whether said two input terms are related by the stated relationship.

2. The method of processing data stored in a relational database management system as set forth in claim 1 wherein said ontology data specifies relationships having a plurality of types between said pairs of terms and wherein said semantic matching operator further specifies a type of the plurality of types for the stated relationship.

3. The method of processing data stored in a relational database management system as set forth in claim 2 wherein said ontology data is identified by an ontology name value and wherein said semantic matching operator specifies said ontology data using said ontology name value.

4. A method of identifying target values stored in one or more selected columns of selected tables in a relational database management system where said target values have relationships to ontology values that are defined in ontology data to which the relational database management system has access, said method comprising:
    forming and executing an SQL query statement in the relational database management system that includes an identification of a semantic matching operator defined in the relational database system that is invoked to identify said target values by consulting said ontology data and returning a result to said executing SQL query statement which indicates whether said target values are related to said ontology values.

5. The method of identifying target values stored in one or more selected columns of selected tables in a relational database management system as set forth in claim 4 wherein said identification of a semantic matching operator is a user-defined operator defined in said relational database management system that extends the pre-existing SQL syntax employed by said relational database management system.

6. The method of identifying target values stored in one or more selected columns of selected tables in a relational database management system as set forth in claim 4 wherein said SQL query statement further includes the identification of said one or more selected columns.

7. The method of identifying target values stored in one or more selected columns of selected tables in a relational database management system as set forth in claim 6 wherein said semantic matching operator is invoked to match target values in said one or more selected columns one with said ontology values by consulting said ontology data.

8. The method of identifying target values stored in one or more selected columns of selected tables in a relational database management system as set forth in claim 4 wherein said ontology data specifies relationships having a plurality of types between said target values and said ontology values and wherein said semantic matching operator further specifies a type of the plurality of types for the relationship.

9. The method of identifying target values stored in one or more selected columns of selected tables in a relational database management system as set forth in claim 8 wherein at least some of said relationships of different types are transitive and wherein said semantic matching operator is invoked to search transitive pathways connected by said transitive relationships.

10. The method of identifying target values stored in one or more selected columns of selected tables in a relational database management system as set forth in claim 9 wherein said semantic matching operator further computes a measure of how closely said target values are related to said ontology values by measuring said transitive pathways.

11. A method of performing an ontology-based matching operation during the execution of a query in a relational database management system, said query being defined by a native structured query language statement, and said method comprising, in combination, the steps of:
 creating and storing in said relational database management system a semantic matching operator that determines whether two input terms are related by a specified relationship as defined by specified ontology data that is accessible to said a relational database management system, and
 constructing and executing a query expressed in the native structured query language in a relational database management system, the query including an identification of said semantic matching operator.

12. The method of performing an ontology-based matching operation as set forth in claim 11 wherein said specified ontology data specifies relationships having types belonging to a plurality of types between said input terms and wherein said identification of said semantic matching operator further specifies a type of the plurality for the relationship.

13. The method of performing an ontology-based matching operation as set forth in claim 12 wherein at least some of said plurality of types of relationships are properties each property specifying a relationship between one term and one or more other terms and wherein said semantic matching operator specifies a property of said properties.

14. The method of performing an ontology-based matching operation as set forth in claim 13 wherein said specified ontology data further specifies that at least one of said properties is a subproperty of another of said properties and wherein said semantic matching operator specifies properties that are subproperties of an identified property.

15. The method of performing an ontology-based matching operation as set forth in claim 13 wherein said properties define transitive relationships and wherein said semantic matching operator infers new relationships based on said transitive relationships during execution.

\* \* \* \* \*